United States Patent
Dickenscheid (10) Patent No.: US 10,626,997 B2
(45) Date of Patent: Apr. 21, 2020

(54) VALVE FOR USE IN THE FEED PIPE OR RETURN PIPE OF A HEATING OR COOLING WATER CIRCUIT

(71) Applicant: TACONOVA GROUP AG, Zurich (CH)

(72) Inventor: Lothar Dickenscheid, Schlieren (CH)

(73) Assignee: TACONOVA GROUP AG, Zurich (CH)

(*) Notice: Subject to any disclaimer, the term of this patent is extended or adjusted under 35 U.S.C. 154(b) by 178 days.

(21) Appl. No.: 15/564,342

(22) PCT Filed: Apr. 9, 2015

(86) PCT No.: PCT/CH2015/000054
§ 371 (c)(1),
(2) Date: Oct. 4, 2017

(87) PCT Pub. No.: WO2015/188284
PCT Pub. Date: Dec. 17, 2015

(65) Prior Publication Data
US 2018/0142802 A1 May 24, 2018

(51) Int. Cl.
*F16K 1/52* (2006.01)
*F16K 31/02* (2006.01)
(Continued)

(52) U.S. Cl.
CPC .......... *F16K 1/52* (2013.01); *F16K 1/36* (2013.01); *F16K 31/025* (2013.01); *F16K 35/06* (2013.01);
(Continued)

(58) Field of Classification Search
CPC . F16K 1/52; F16K 1/36; F16K 31/025; F16K 1/00; F16K 35/06; F24D 19/1015; Y10T 137/6011
(Continued)

(56) References Cited

U.S. PATENT DOCUMENTS

| 3,168,805 A | 2/1965 | Fleury |
| 4,089,461 A * | 5/1978 | Gocke ................. G05D 23/023 236/100 |

(Continued)

FOREIGN PATENT DOCUMENTS

| CN | 2079238 U | 6/1991 |
| CN | 1625674 A | 6/2005 |

(Continued)

OTHER PUBLICATIONS

Chinese First Office Action, Chinese Patent Application No. 201580078629.0, dated Dec. 5, 2018.

(Continued)

*Primary Examiner* — John Bastianelli
(74) *Attorney, Agent, or Firm* — Marshall, Gerstein & Borun LLP (57) ABSTRACT

A valve for use in a heating or cooling water circuit includes a housing that forms a feed line and a discharge line, and an adjusting unit that is formed separate from the housing and penetrates into the housing for adjusting a flow rate through the valve. The adjusting unit has a valve closing body which is operatively connected to a valve tappet in such a way that the valve closing body together with a valve seat body that in the intended operation is stationary in relation to the housing, forms a valve gap which is adjustable by axially moving the valve tappet. The valve is designed such that the valve gap in the intended operation, when the valve tappet is not actuated, is closed by closing forces and when the valve tappet is actuated in order to open the valve gap, these closing forces have to be overcome.

31 Claims, 6 Drawing Sheets

(51) Int. Cl.
*F16K 35/06* (2006.01)
*F16K 1/36* (2006.01)
*F24D 19/10* (2006.01)

(52) U.S. Cl.
CPC ..... *F24D 19/1015* (2013.01); *Y10T 137/6011* (2015.04)

(58) Field of Classification Search
USPC ............... 251/11, 129.06, 129.03, 289, 291; 137/315.11
See application file for complete search history.

(56) References Cited

U.S. PATENT DOCUMENTS

| | | | | |
|---|---|---|---|---|
| 4,176,786 | A | * | 12/1979 | Braukmann ......... G05D 23/023 236/42 |
| 4,277,941 | A | * | 7/1981 | Povero ..................... F01N 3/22 60/307 |
| 4,611,786 | A | * | 9/1986 | Jorgensen ........... F24D 19/0009 138/42 |
| 6,119,724 | A | * | 9/2000 | Cazzaniga ................ G01F 1/28 137/552 |
| 6,325,098 | B1 | | 12/2001 | Motta et al. |
| 6,994,109 | B2 | * | 2/2006 | Spiess ....................... G01F 1/28 137/552 |
| 7,036,789 | B2 | * | 5/2006 | Famos ................ F24D 19/1015 137/553 |
| 7,121,299 | B2 | * | 10/2006 | Lumello ............... F24D 3/1066 137/552 |
| 8,544,819 | B2 | * | 10/2013 | Straub ................. F24D 19/1015 137/551 |

FOREIGN PATENT DOCUMENTS

| | | |
|---|---|---|
| CN | 101360941 A | 2/2009 |
| CN | 201844085 U | 5/2011 |
| CN | 102235505 A | 11/2011 |
| CN | 102313070 A | 1/2012 |
| CN | 202266682 U | 6/2012 |
| CN | 102620026 A | 8/2012 |
| CN | 203082223 U | 7/2013 |
| DE | 19753575 A1 | 6/1999 |
| DE | 20201730 U1 | 6/2002 |
| EP | 2241794 A1 | 10/2010 |
| GB | 798369 A | 7/1958 |
| GB | 2146411 A | 4/1985 |
| WO | WO-03089844 A1 | 10/2003 |

OTHER PUBLICATIONS

International Search Report for International application No. PCT/CH2015/000054, dated Jan. 5, 2016.

* cited by examiner

VALVE FOR USE IN THE FEED PIPE OR RETURN PIPE OF A HEATING OR COOLING WATER CIRCUIT

CROSS-REFERENCE TO RELATED APPLICATIONS

This is the United States national phase of International Patent Application No. PCT/CH2015/000054, filed Apr. 9, 2015, the entire contents of which are expressly incorporated herein by reference.

FIELD OF THE DISCLOSURE

The disclosure relates to a valve for use in the feed pipe or return pipe of a heating or cooling water circuit, an adjusting unit for such a valve, an arrangement comprising such an adjusting unit or such a valve as well as a distribution arrangement comprising at least two such valves or arrangements according to the preambles of the independent claims.

BACKGROUND

In water circuits for heating or cooling, valves are used by means of which the flow rate through the water circuit is controlled, and therewith the amount of heat which is provided or withdrawn.

At heating arrangements having radiators, it is common that each radiator comprises its own valve arranged at its feeding connecting piece, which valve by means of a thermostatic control head, depending on the desired and the measured room temperature, starting from an opened position when the valve is not actuated more or less closes the feed pipe. For doing so, a closing spring arranged in the control head is more or less released by a driving element of the control head, e.g. a bimetal actuator or an expansion material element. In case for reaching or keeping, respectively, of the desired room temperature no addition of heat is required, the respective distribution valve is kept closed by the released closing spring of the control head.

At floor heating installations, the distribution of the heated heating water to the individual heating circuits typically is accomplished via a distribution manifold, which for each heating circuit has a branch line, by means of which the heating water is supplied to the respective heating circuit. In doing so, it is common to form by means of adjusting units screwed into the distribution manifold for each heating circuit an own distribution valve within the distribution manifold, by means of which distribution valve the flow rate through the branch line dedicated to this heating circuit is adjustable or controllable, respectively. In case of a controlling of the flow rate, this controlling is accomplished typically temperature controlled by means of an actuator which is arranged at the respective adjusting unit, which is activated by an external control unit and depending on the activation by the control unit more or less closes the distribution valve assigned to it. For doing so, a closing spring arranged in the actuator is more or less released by a driving element of the actuator, e.g. an expansion material element. In case no supply of heat to the respective heating circuit is required, the respective distribution valve is kept closed by the released closing spring of the actuator.

The control heads and actuators used today have the disadvantage that they are built from a large number of components, which renders them interference-prone, expensive in manufacturing and furthermore quite bulky.

The last mentioned disadvantage is especially annoying in particular in the last mentioned floor heating installations having distribution manifolds with a large number of distribution valves arranged side by side, since there is a permanent desire for a reduction in the space requirements of the distribution manifolds, which is opposed today essentially by the size (height and width) of the actuators.

A general disadvantage of today's radiator and distribution valves consists in that after an extended downtime of the heating installation, e.g. after the summer period, it often comes to malfunctions, because the valves, which then after a long time are released again by the closing spring of the control heads or actuators, respectively, often do not self-acting open again, thus no flow through the respective valve takes place and also no controlling via the control head or the actuator is possible.

GENERAL DESCRIPTION

Therefore, it is an objective to provide technical solutions which do not show the disadvantages of the prior art or avoid them at least partially.

This objective is achieved by the subjects of the independent claims.

Accordingly, a first aspect of the invention concerns a valve for use in the feed pipe or return pipe of a heating or cooling water circuit, preferably a valve for direct installation at the feeding connecting piece of a radiator (radiator valve) or for a distribution valve for a floor heating circuit formed with a distribution manifold.

The valve comprises a housing made of one or several pieces, which forms a feed line and a discharge line. An adjusting unit, which is formed separate from the housing, penetrates into the housing, for adjusting or controlling, respectively, a flow rate through the valve from the feed line to the discharge line. Depending on the construction of the valve, the valve can be flown through as intended only in one direction or in both directions, wherein in the last mentioned case the determination which line is the feed line and which line is the discharge line results from the installation situation.

The adjusting unit, which as well forms an independent aspect of the invention and which later on will separately by discussed, comprises a valve closing body, which is operatively connected to a valve tappet also belonging to the adjusting unit in such a way that the valve closing body together with a valve seat body, which in the intended operation is stationary in relation to the housing, forms a valve gap which is adjustable by axially moving the valve tappet, by means of which valve gap the flow rate through the valve can be adjusted or controlled, respectively.

The valve is designed in such a way that the valve gap in the intended operation when the valve tappet is not actuated, i.e. in the absence of adjusting or actuating forces, respectively, is closed because of hydraulically, pneumatically and/or mechanically generated closing forces, and that these forces have to be overcome when the valve tappet is actuated in order to open the valve gap.

With such valves according to the invention it becomes possible to develop and use actuators for actuating them, which dispense with the need for a closing spring and which allow the valve tappet to be actuated directly by the active driving element of the actuator. This allows for a significant reduction in the size (height and width) of the actuators and it becomes possible to provide forces for the opening of the valves which are many times higher than at today's valves, thus substantially improving operational reliability, in particular following an extended downtime of the heating system during which the valve is closed.

The closing forces can hydraulically be generated in that the medium which is flowing through the valve with a force acting in valve closing direction acts upon the valve closing body and/or the valve tappet, which force, when the valve tappet is not actuated, closes the valve, and/or in that the valve is kept closed by the pressure of the medium that is present.

The closing forces can pneumatically be generated in that a pneumatic spring element is present or a pressurized corrugated bellow, which permanently with a force acting in valve closing direction acts upon the valve closing body or the valve tappet.

The closing forces can mechanically be generated in that a spring, e.g. a spiral spring, is present, which permanently with a force acting in valve closing direction acts upon the valve closing body or the valve tappet. This variant is especially preferred, since it enables with simple means a reliable closing function.

Further, it is envisaged to generate the closing forces by a combination of two or more of the before mentioned functional principles.

The feed line and the discharge line of the valve can be formed by a common housing part or by separate housing parts. Depending on the valve variant, the one or the other embodiment is more preferred. Thus, it is e.g. for radiator valves, in which the housing typically is embodied as 90° elbow pipe into which the adjusting unit is screwed in the area of the corner, preferred that the feed line and the discharge line are formed by a common housing part, while for distribution valves it is preferred that the feed line and the discharge line are formed by separate housing parts (distribution manifold/branch line fitting), by screwing in the branch line fittings into the distribution manifold, because by this the manufacturing of the distribution manifold is significantly simplified.

Preferably, the adjusting unit penetrates opposite to the feed line or opposite to the discharge line into the housing. By this, it becomes possible in a simple manner to directly connect one side of the valve gap to the respective feed or discharge line.

In doing so, it is of advantage that the valve closing body of the adjusting unit is arranged at that end of the valve tappet, which is facing the opposite feed line or discharge line. By this, a compact construction of the valve becomes possible.

In case the valve is designed such that for opening the valve gap, the valve tappet has to be moved in direction towards the opposite feed line or discharge line, which is preferred, a simple construction of the valve is promoted.

In a further preferred embodiment of the valve, the valve seat body is formed by a component of the adjusting unit. By this, the entire valve functionality is provided by the adjusting unit and the valve housing merely serves for the feeding and discharging of the medium. This results in the advantage, that by an exchange of the adjusting unit, in a simple manner all components of the valve that are relevant for the function can be exchanged.

In still another preferred embodiment of the valve, the valve closing body and the valve seat body are designed in such a way that, when the valve gap is closed, a radial or at least partial radial sealing between the valve closing body and the valve seat body results. This is by advantage accomplished by a sealing element of the valve closing body which is at least partial radial sealing. The partial radial sealing improves the opening behavior after a longer closed operational state and a cleaning effect on the sealing surface.

For the realization of the at least partial radial sealing, the outermost radial circumferential margin of the valve closing body as seen in radial direction preferably is formed by a separate sealing element, e.g. by an O-ring, which when the valve gap is closed effects an at least partial radial sealing as against the valve seat body, and at the same time in a form-locking manner prevents that the valve tappet with the valve closing body in the closing movement direction of the valve tappet can be removed out of the adjusting unit. In this way, the sealing element at the same time can serve for the retaining of the valve tappet.

By advantage, the valve according to the invention as-supplied possesses preferably without the use of tools removable arresting means, by means of which the valve tappet is arrested in an axial position in which the valve gap is opened, preferably is maximally opened. The arresting by advantage is accomplished in a form-locking manner. This is of advantage in particular in distribution valves, because in this way even without already installed actuators the individual heating or cooling circuits can be operated and hydraulically adjusted.

Preferably, the arresting means comprise an arresting pin, which from the outside radially penetrates into the adjusting unit, e.g. via a relief bore, and thereby radially penetrates through the valve tappet or at least radially penetrates into it. By this, a form-locking arresting can be accomplished in a simple way.

The valve tappet of the adjusting unit, at least in the area of its end which is facing away from the valve closing body, is formed of an electrically poorly or not conducting material, respectively, e.g. of plastics, so that a possible introduction of electric current from an electric actuated actuator which adjoins to it via the valve tappet into the medium that is flowing in the valve can reliably be prevented.

In still a further preferred embodiment of the valve, a static housing part of the adjusting unit, which at least partially is penetrated by the valve tappet, comprises radial or half axial passing through openings, preferably of circular or rectangular shape, through which the medium depending on the installation situation or the passing through direction of the valve, respectively, can flow from the feed line to the valve gap or can flow from the valve gap to the discharge line.

By this, in particular in combination with the further preferred design, in which the static housing part of the adjusting unit, in particular with its face side, via sealing surfaces and/or via a sealing is in sealing contact with a static housing part of the valve housing, which housing part forms the feed or the discharge line such that between the passing through openings and the feed line or the discharge line formed by this housing part a fluid-tight flow channel is formed, the advantage is arrived at that a quite simple construction of the valve housing becomes possible and all functional components are formed by the adjusting unit, which in an easy way can be designed to be exchangeable.

In an especially preferred embodiment, the valve is designed as distribution valve for the use in the feed pipe or return pipe of a heating or cooling water circuit, thus in such a manner that the housing of the valve is formed substantially by a distribution manifold, which depending on the flowing through direction is forming the feed line or discharge line, and by a branch line, which is branching off from the distribution manifold and depending on the flowing through direction is forming the discharge line or the feed line. Thereby, the adjusting unit penetrates into the distribution manifold opposite to the branch line. In such embodiments of the valve according to the invention, the advantages of the invention become especially clearly evident.

Thereby, it is further preferred that the valve closing body is arranged at the end of the valve tappet which is facing towards the branch line, and in particular also that the valve tappet for opening the valve gap has to be moved against the closing forces, preferably against a spring force generated by spring means, in direction towards the branch line. By these embodiments, very compact distribution valves become possible.

Further, it is desirable at the distribution valves according to the invention that the static housing part of the adjusting unit, preferably at its front face, via sealing surfaces and/or via a sealing is in sealing contact with a static housing part of the branch line, such that between the passing through openings and the branch line a fluid-tight flow channel is formed. This measure as well promotes a simple and compact valve construction.

A second aspect of the invention concerns an adjusting unit for a valve according to the first aspect of the invention.

The adjusting unit comprises a base body for screwing in the adjusting unit into a receiving opening of a valve housing, a valve tappet, a valve closing body and a valve seat body. The valve seat body with respect to the base body is static and the valve tappet with respect to the base body is axially moveable supported in the base body. Thereby, the valve tappet is operatively connected to the valve closing body, e.g. by being commonly formed in one-piece design, in such a manner that the valve closing body together with the valve seat body forms a valve gap which is adjustable and can also be fully closed by axially moving the valve tappet. Thereby, the adjusting unit is designed such that the valve gap, when the valve tappet is not actuated, i.e. in the absence of external forces which from the outside in opening direction are acting upon the valve tappet, is closed, e.g. due to the closing forces of a closing spring, or can assume a closed position, so that in the intended use of the adjusting unit within a valve according to the invention, when the valve tappet is not actuated, the valve gap can be closed, e.g. by flow forces of the medium flowing through the valve which are acting upon the valve tappet. Such adjusting units represent a preferred commercialization of the invention.

Preferably, the adjusting unit comprises spring means which are operatively connected to the valve closing body or to the valve tappet such that the valve gap, when the valve tappet is not actuated, is closed because of the spring forces of the spring means, and when the valve tappet is actuated for opening the valve gap, the spring forces of the spring means have to be overcome.

Further, it is preferred that the base body of the adjusting unit in an area, in which it is at least partially penetrated by the valve tappet, comprises radial or half axial passing through openings, in particular of circular or rectangular shape, through which, depending on the flowing through direction, medium can flow into the adjusting unit up to the valve gap or medium coming from the valve gap can flow out of the adjusting unit, respectively.

Also, it is of advantage that the valve seat body is formed by the base body of the adjusting unit.

The advantages of these preferred embodiments of the adjusting unit according to the invention become apparent when using them as intended within a valve according to the invention according to the first aspect of the invention and have been described already in that context.

A third aspect of the invention concerns an arrangement comprising an adjusting unit according to the second aspect of the invention or a valve according to the first aspect of the invention in combination with an actuator, by means of which in the intended operation the valve tappet of the adjusting unit for opening the valve gap can be actuated or moved, respectively, against the closing forces, preferably in several steps or stepless. Such arrangements represent a further preferred commercialization of the invention.

Preferably, the actuator comprises a pneumatically, hydraulically or electrically controllable or activatable, respectively, drive element, e.g. a pneumatic or hydraulic piston/cylinder unit, an electrical servomotor or an electrically heatable expansion material element, for providing the actuating forces for the axial moving of the valve tappet in order to open the valve gap. Such drive elements can be controlled or activated, respectively, in an easy way by central control units.

The drive element is arranged preferably in axial extension of the valve tappet in the closing movement direction of the valve tappet, wherein it is further preferred that the drive element can directly act upon the end of the valve tappet which points in the closing movement direction, for moving the valve tappet against the closing movement direction in order to open the valve gap.

This means that, in valves according to the first aspect of the invention which are designed as distribution valves, the drive element is arranged in axial extension of the valve tappet in the direction pointing away from the branch line, and that the drive element can preferably directly act upon the end of the valve tappet which is facing away from the branch line, for moving the valve tappet in direction towards the branch line thereby opening the valve gap.

Such arrangements according to the invention have the advantage that they can be of simple and robust construction and that, due to the possibility to directly act upon the valve tappet with the drive element, a high mechanical efficiency can be reached.

In a preferred embodiment of the arrangement according to the invention, the drive element of the actuator by means of a support structure, which e.g. is embodied as pushbutton, is received within the adjusting unit, which support structure is supported in an axially moveable manner along the displacement axis of the valve tappet within the adjusting unit, such that, when the valve gap is closed, it can be moved by a manual pushing actuation from the outside together with the drive element which is received therein from a base position against the closing movement direction of the valve tappet, thereby at the same time over at least a part of the displacement path moving the valve tappet in this direction and thus resulting in an opening of the valve gap. Through such a construction it becomes possible to also open the valve gap manually, e.g. for testing purposes.

If in that case the support structure is supported in the adjusting unit in such a way that it latches in a displacement position in which the valve gap is open, preferably is maximally open, so that upon a cancellation of the manual pushing actuation it stays in this displacement position, which is preferred, a permanent opening of the valve gap can be effected manually.

In that case it is further preferred that the support structure is supported in the adjusting unit in such a way and the drive element is arranged therein in such a way that the latching of the support structure can be cancelled by controlling or activating, respectively, the drive element. By this, an automatic reset in the original state when the drive element is activated or controlled, respectively, can be effected.

Also it is in the before mentioned embodiments of the arrangement of advantage, if the support structure is supported in the adjusting unit in such a way that from outside it is visually recognizable if the support structure is in the base position or in the latched displacement position.

Further, the arrangement according to the invention preferably is designed in such a way that the actuator is exchangeable during the intended operation of the valve which is equipped with it, without causing a leakage by doing so.

A fourth aspect of the invention concerns a distribution arrangement comprising at least two valves according to the first aspect of the invention or comprising at least two arrangements according to the third aspect of the invention, wherein the housing of the valves are formed by a common distribution manifold. Such distribution arrangements represent a further preferred commercialization of the invention.

BRIEF DESCRIPTION OF THE DRAWINGS

Further advantages and applications of the invention become apparent from the following description by means of the figures. Therein show.

DETAILED DESCRIPTION

Figure 1:
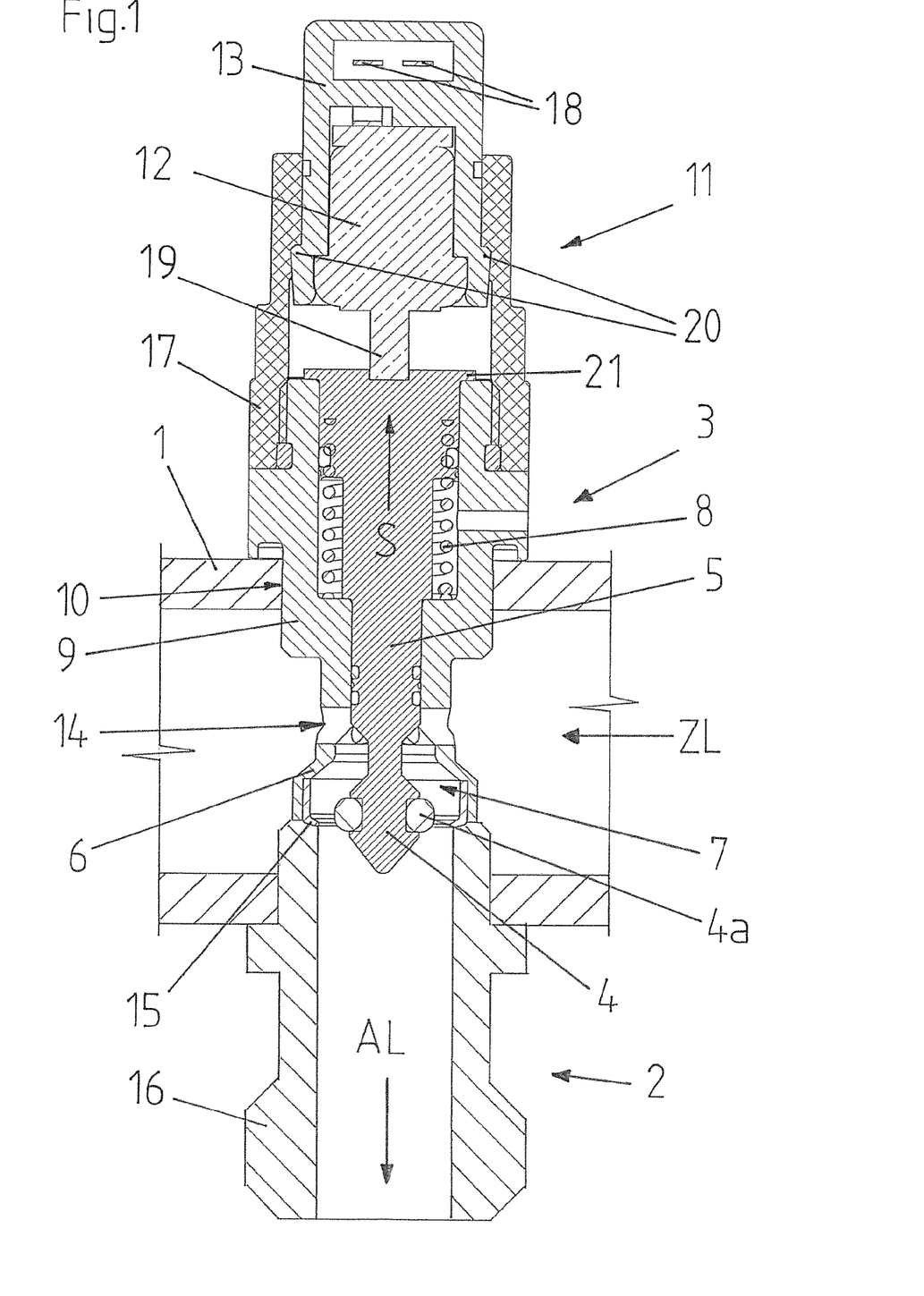
FIG. 1 a vertical section through a distribution valve according to the invention with actuator.

FIG. 1 shows a distribution valve according to the invention according to the first aspect of the invention with an adjusting unit 3 according to the second aspect of the invention and an actuator 11 for actuation of the adjusting unit 3 in vertical section. The distribution valve or the adjusting unit 3, respectively, and the actuator 11 together form an arrangement according to the invention according to the third aspect of the invention. The distribution valve is part of a distribution arrangement according to the invention according to the fourth aspect of the invention and is arranged in the feed pipe of a warm water heating circuit (not shown). The further distribution valves of the distribution arrangement, which are arranged left and/or right beside the illustrated distribution valve, are not shown and from the distribution manifold 1 only that portion is shown which is required for the illustration of the depicted distribution valve.

As becomes apparent in a synopsis with the FIGS. 2, 2a and 3, 3a, which show vertical sections and details of these sections of the adjusting unit 3 and the actuator 11 with closed valve gap 7 (FIGS. 2 and 2a), the valve housing 1, 16 of the distribution valve is formed by a distribution manifold 1 forming the feed line ZL and by a fitting 16 that is screwed from the bottom into the distribution manifold 1. The fitting 16 forms a branch line 2 branching off from the distribution manifold 1, which forms the discharge line AL of the distribution valve and discharges into the feed pipe of the warm water heating circuit (not shown).

Opposite to the branch line 2, the adjusting unit 3 which serves for adjusting the flow rate through the branch line 2, is screwed from the top into the distribution manifold 1.

The adjusting unit 3 comprises a base body 9, by means of which it is screwed into a threaded hole 10 in the distribution manifold 1, as well as a valve tappet 5, a valve closing body 4 with associated O-ring sealing 4a and a valve seat body 6, which is formed in one-piece design together with the base body 9 and provides the valve seat for the valve closing body 4 and the sealing 4a, respectively. The base body 9 at its front side abuts with a sealing 15 onto the end of the branch line fitting 16 which extends into the distribution manifold 1.

The valve closing body 4 is arranged at that end of the valve tappet 5, which is facing towards the branch line 2, and is formed of a plastics material in one-piece design together with the valve tappet 5. The valve tappet 5 is axially moveable supported in the base body 9 in such a way that by axially moving the valve tappet 5, a valve gap 7 formed between the valve closing body 4 with sealing 4a and the valve seat body 6 can be altered or adjusted, respectively, and can also be closed. As is visible in particular in FIG. 2a, a radial sealing between the valve closing body 4 and the valve seat body 6 via the O-ring 4a arranged between them results when the valve gap 7 is closed. The O-ring 4a at the same time prevents in a form-locking manner that the valve tappet 5 with the valve closing body 4 in the closing movement direction S of the valve tappet 5 can be removed out of the adjusting unit 3 in case no actuator is installed.

The base body 9 of the adjusting unit 3 directly above the valve seat body 6 comprises radial passing through openings 14 having a circular shape, through which the warm water flowing in the feed line ZL can flow into the adjusting unit 3. When the valve gap 7 is closed, the feed line ZL and the discharge line AL are separated from each other by the adjusting unit 3. When the valve gap 7 is opened, warm water flows from the feed line ZL via the passing through openings 14 and the valve gap 7 in the discharge line AL, wherein the flow rate can be adjusted by means of the opening width of the valve gap 7.

Further, the adjusting unit 3 comprises a spiral spring 8, which is penetrated by the valve tappet 5 and which acts upon the valve tapped 5 in the closing movement direction S with a spring force, so that the valve gap 7 when the valve tappet 5 is not actuated, i.e. in the absence of actuating forces at the valve tappet 5, is closed by the spring force or is kept close by it, respectively. This situation is illustrated in the FIGS. 2 and 2a.

Figure 2:
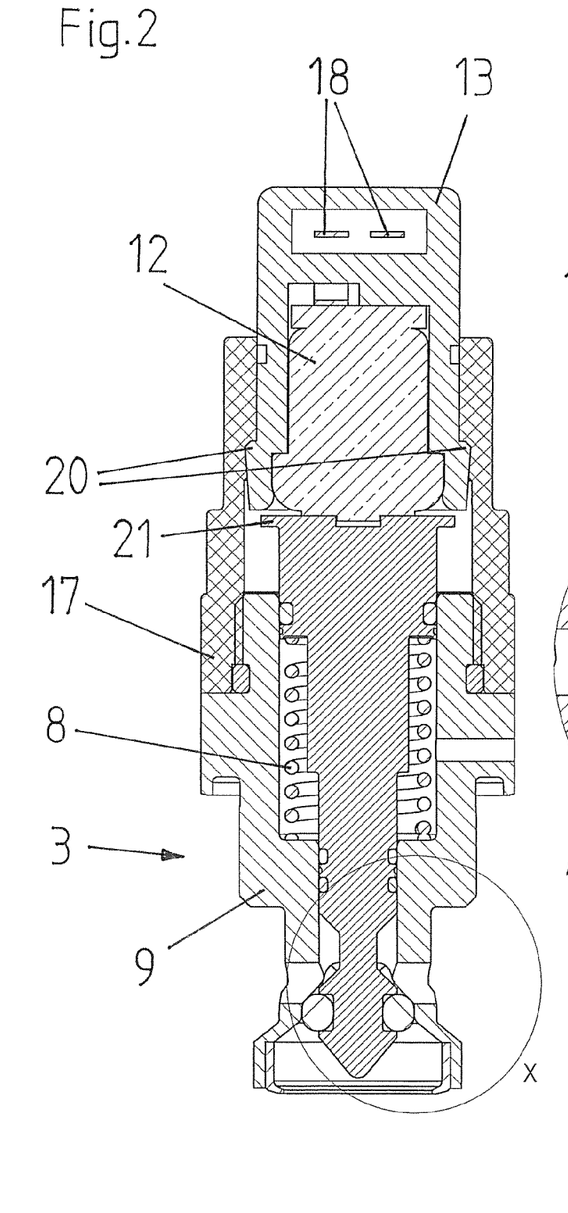
FIG. 2 a vertical section through the adjusting unit according to the invention and the actuator of the distribution valve of FIG. 1 with closed valve gap.
Figure 2A:
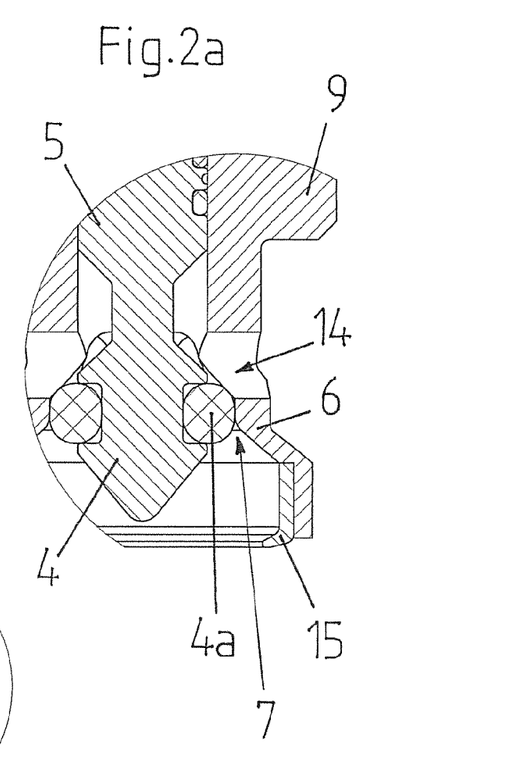
FIG. 2a the detail X of FIG. 2.
Figures 3, 3A:
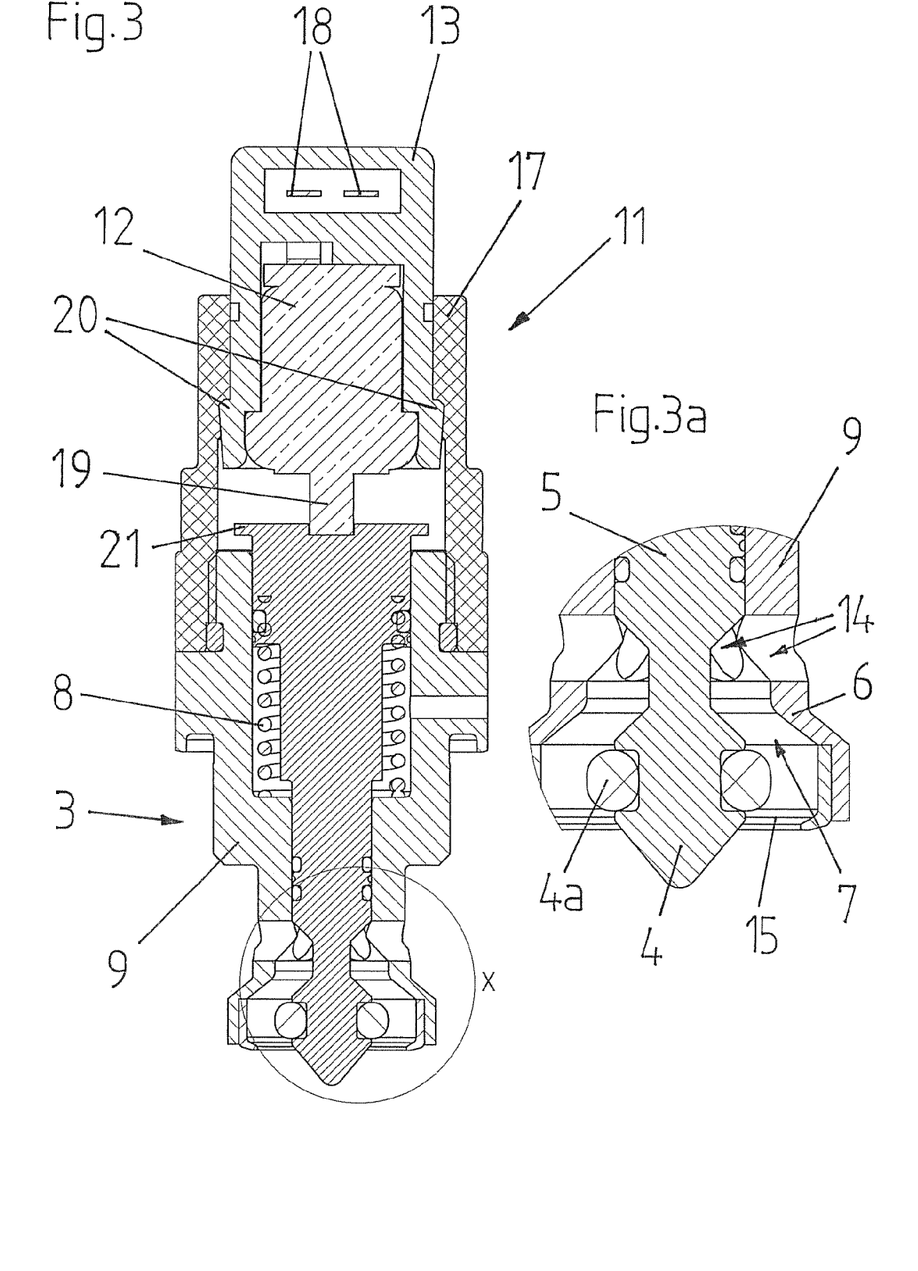
FIG. 3 a vertical section through the adjusting unit according to the invention and the actuator of the distribution valve of FIG. 1 with fully opened valve gap.
FIG. 3a the detail X of FIG. 3.

In order to arrive, starting from the fully closed operational situation depicted in the FIGS. 2 and 2a, at the maximally opened operational situation depicted in the FIGS. 3 and 3a, the valve tappet 5 has to be actuated in such a way that it is moved against the spring force of the spiral spring 8 in direction towards the branch line 2.

The actuator 11 serves for this. This consists of an adapter housing 17, by means of which it is attached to the adjusting unit 3, and within which inside an actuating button 13 an expansion material element 12 is received as drive element which can be activated via two electrical contactors 18 arranged at the outside of the actuating button 13. The expansion material element 12 is arranged in the axial extension of the valve tappet 5 in the closing movement direction S of the valve tappet 5 and in the activated state directly acts with an actuating tappet 19 upon the end of the valve tappet 5 which is facing away from the branch line 2, so that the valve tappet 5 is moved in direction towards the branch line 2 and the valve gap 7 is opened. This situation is illustrated in the FIGS. 3 and 3a.

Figure 4:
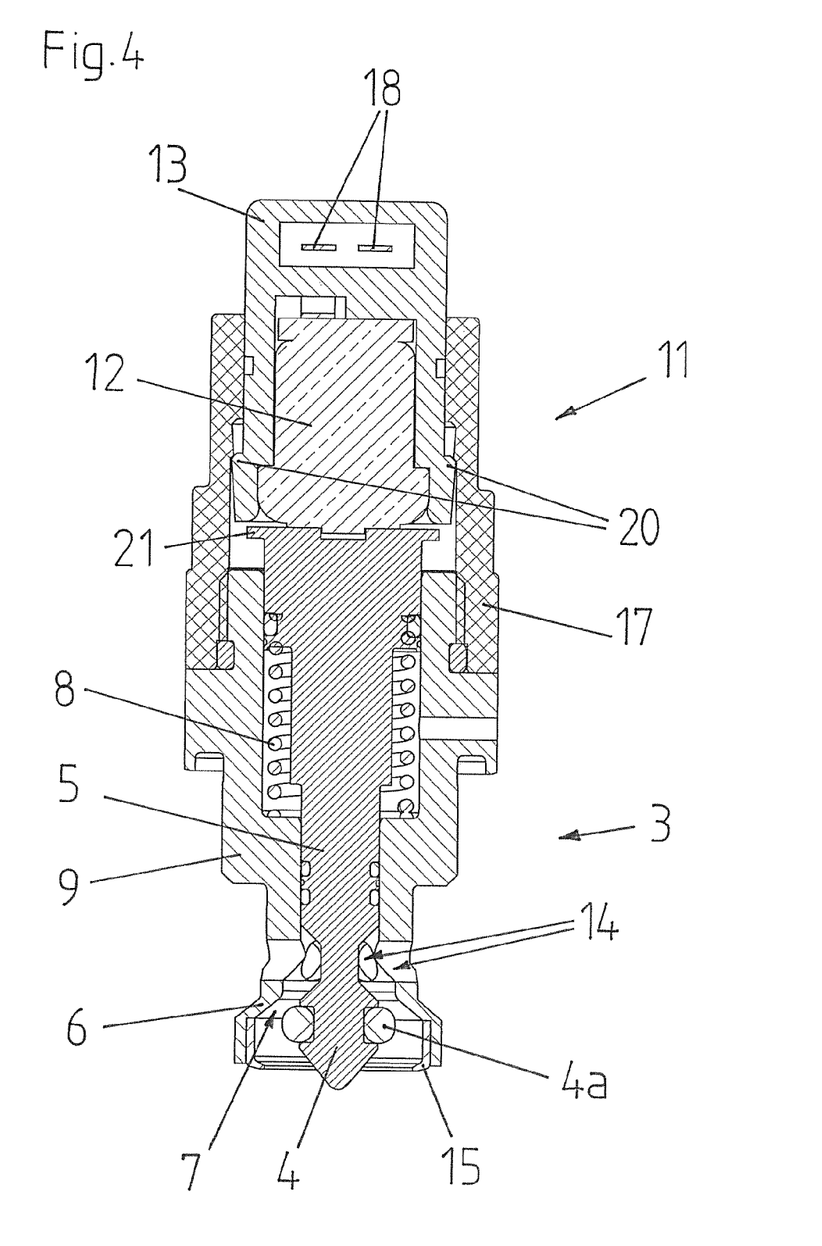
FIG. 4 a vertical section through the adjusting unit according to the invention and the actuator of the distribution valve of FIG. 1 with arrested actuating button and non-extended actuating tappet.

As can be seen from a synopsis of the FIGS. 2 and 4, the actuating button 13 with the expansion material element 12 received therein is axially moveable along the displacement axis of the valve tappet 5 supported in the adapter housing 17, such that it can be moved, starting from the situation depicted in the FIG. 2 with non-activated expansion material element 12 and closed valve gap 7, out of the base position shown in FIG. 2 through a manual pushing actuation from the outside together with the expansion material element 12 received therein in direction towards the branch line 2 into the displacement position shown in FIG. 4. By doing so, at the same time also the valve tappet 5, through the expansion material element 12 which abuts to the valve tappet 5, at least over a part of the displacement paths of the actuating button 13 is moved in this direction, which results in an opening of the valve gap 7. When reaching the displacement position illustrated in FIG. 4, the actuating button 13 latches with snap-in lugs 20 formed at it in the adapter housing 17, so that upon a cancellation of the manual pushing actuation it stays in this displacement position and the valve gap 7 stays open.

Figure 5:
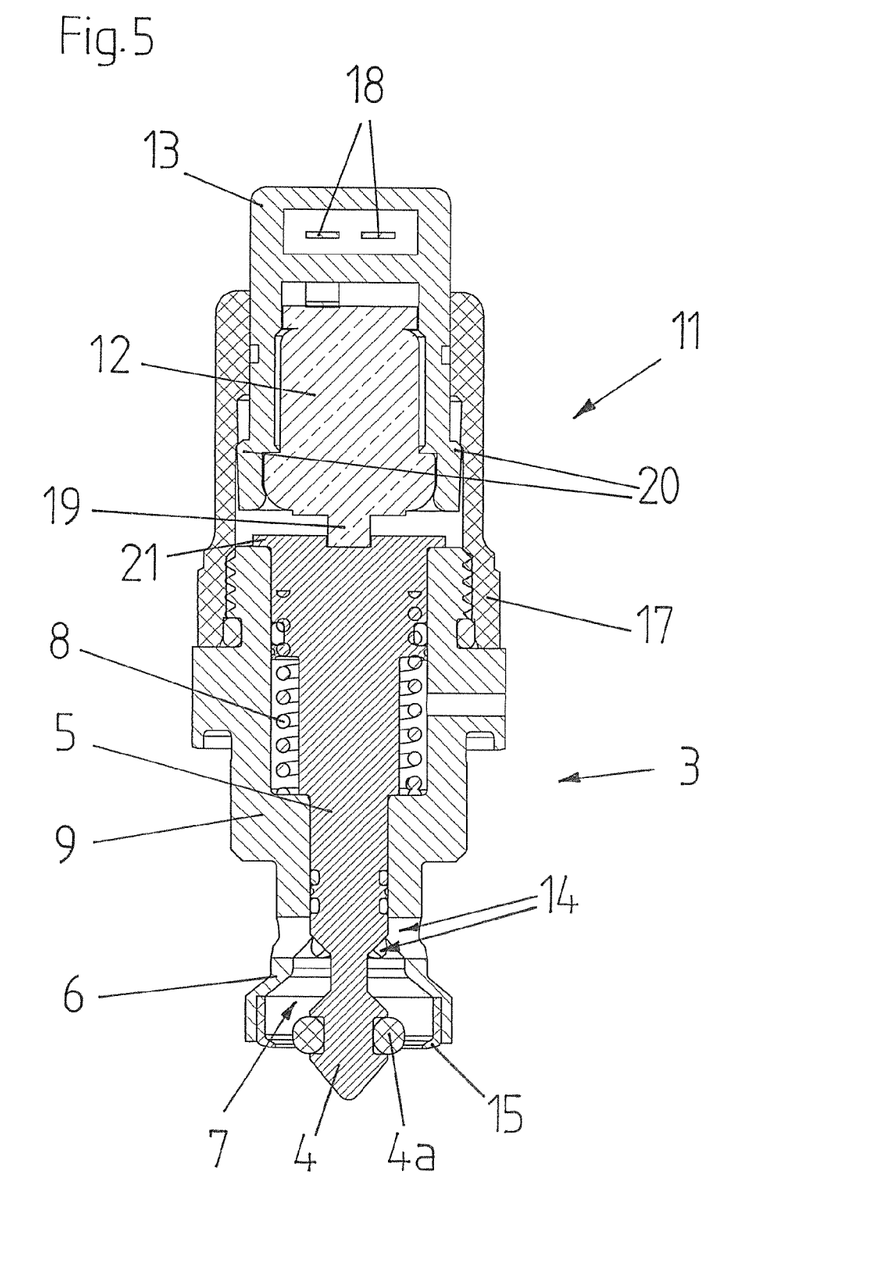
FIG. 5 a vertical section through the adjusting unit according to the invention and the actuator of the distribution valve of FIG. 1 with arrested actuating button and partially extended actuating tappet.

In order to cancel the latched situation shown in FIG. 4, the actuating button 13 has to be moved with a certain force relative to the adapter housing 17 in direction pointing away from the branch line 2. This can be accomplished by manually grasping the actuating button 13 and pulling it out of the adapter housing 17, or by electrically activating the expansion material element 12. In the last mentioned case, the actuating tappet 19 extends out of the expansion material element 12 and moves the valve tappet 5 in the direction towards the branch line 2 until an abutment collar 21 formed at the end of the valve tappet 5 which is facing away from the branch line 2 abuts against the face side of the base body 9 of the adjusting unit 3. This situation is shown in FIG. 5.

By further activating the expansion material element 12 and accordingly further extending the actuating tappet 19 out of the expansion material element 12, the retention force of the latching is overcome and the actuating button is brought back into its basic position.

Figure 6:
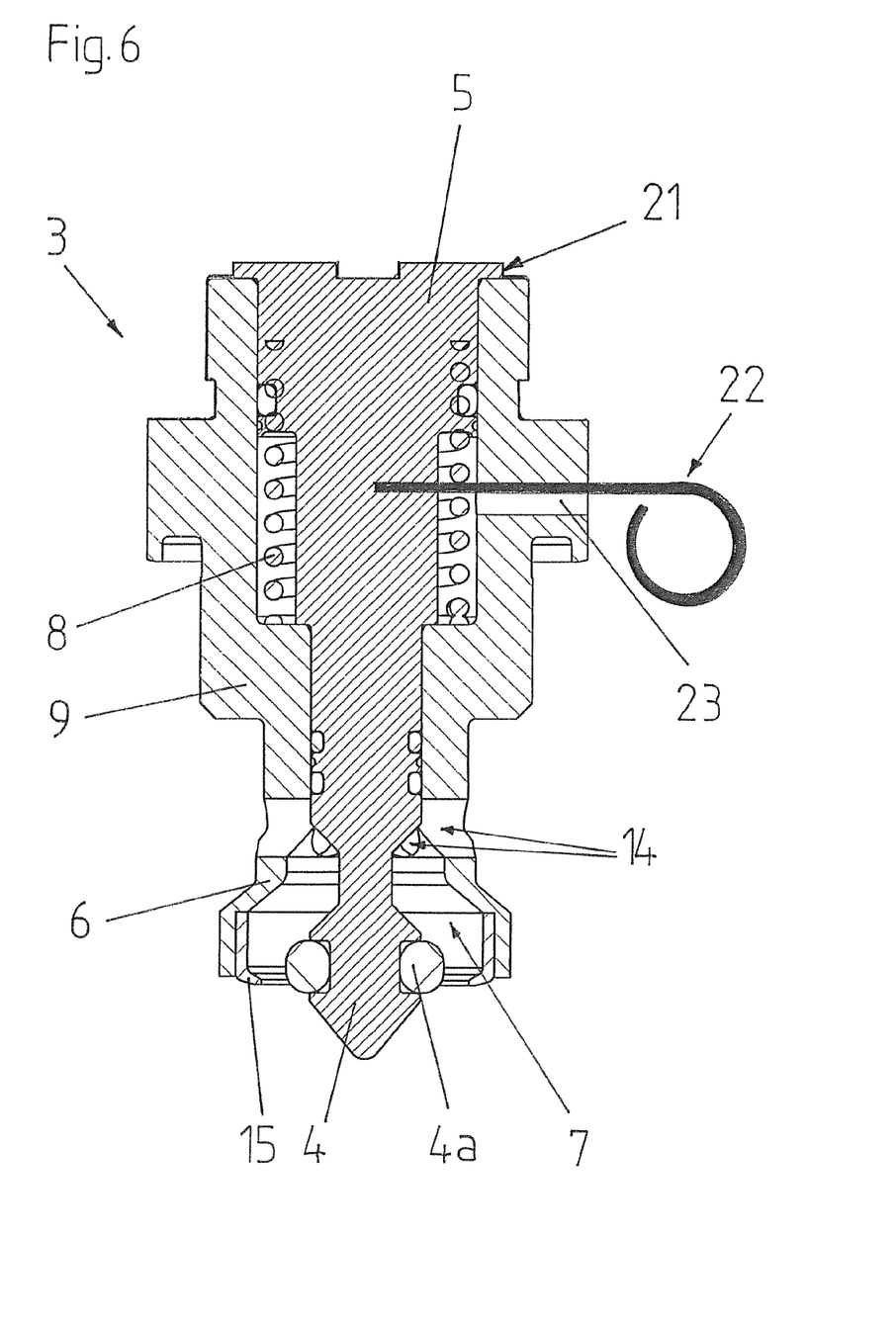
FIG. 6 a vertical section through the adjusting unit of the distribution valve of the FIGS. 1 to 5 as-supplied.

FIG. 6 shows a vertical section through the adjusting unit of the distribution valve as-supplied, i.e. before its commissioning. As can be seen, the valve tappet 5 is in a form-locking manner arrested in an axial position in which the valve gap 7 is opened by an arresting pin 22, which from the outside radially penetrates via a relief bore 23 in the base body 9 into the adjusting unit 3 and into the valve tappet 5. In case the arresting pin 22 is radially pulled out of the adjusting unit 3, the spiral spring 5 pushes the valve tappet 5 in the closing movement direction S and by doing so closes the valve gap 7.

While in the present application there are described preferred embodiments of the invention, it is to be distinctly understood that the invention is not limited thereto and may by otherwise variously be embodied and practiced within the scope of the following claims.

The invention claimed is:

1. An arrangement comprising a valve for use in a feed pipe or return pipe of a heating or cooling water circuit, the valve comprising a housing that forms a feed line and a discharge line, and an adjusting unit that is formed separate from the housing and penetrates into the housing so as to adjust a flow rate through the valve from the feed line to the discharge line,
   wherein the adjusting unit comprises a base body, by which the adjusting unit is screwed into a receiving opening of the valve housing, as well as a valve tappet, a valve closing body and a valve seat body,
   wherein the valve seat body as against the base body is static and the valve tappet as against the base body is axially moveable supported in the base body and is operatively connected to the valve closing body in such a manner that the valve closing body together with the valve seat body forms a valve gap which is adjustable by axially moving the valve tappet,
   wherein the valve is designed such that the valve gap in the intended operation when the valve tappet is not actuated is closed because of hydraulically, pneumatically and/or mechanically generated closing forces and when the valve tappet is actuated in order to open the valve gap these closing forces have to be overcome,
   the arrangement further comprising an actuator, by which in the intended operation the valve tappet for opening the valve gap can be moved against the closing forces,
   wherein the actuator comprises a pneumatically, hydraulically or electrically controllable or activatable, respectively, drive element, for providing the actuating forces for the moving of the valve tappet in order to open the valve gap,
   wherein the drive element is arranged in an axial extension of the valve tappet in the closing movement direction of the valve tappet,
   and wherein the drive element via a support structure is received within the adjusting unit and wherein this support structure is supported in an axially moveable manner along the displacement axis of the valve tappet within the adjusting unit, such that, when the valve gap is closed, the support structure can be moved by a manual pushing actuation from the outside together with the drive element which is received therein from a base position against the closing movement direction of the valve tappet, thereby at the same time over at least a part of the displacement path moving the valve tappet in this direction and thus resulting in an opening of the valve gap.

2. The arrangement according to claim 1, wherein the drive element can directly act upon the end of the valve tappet which points in the closing movement direction, for moving the valve tappet against the closing movement direction.

3. The arrangement according to claim 1, wherein the support structure is embodied as push-button.

4. The arrangement according to claim 1, wherein the drive element is an electrically controllable or activatable, respectively, expansion material element.

5. The arrangement according to claim 1, wherein the valve is designed as a distribution valve for the use in the feed pipe or return pipe of a heating or cooling water circuit such that the housing is formed substantially by a distribution manifold which is forming the feed line or discharge line and by a branch line, which is branching off from the distribution manifold and is forming the discharge line or the feed line, wherein the adjusting unit penetrates into the distribution manifold opposite to the branch line.

6. The arrangement according to claim 5, wherein the valve closing body is arranged at the end of the valve tappet which is facing towards the branch line.

7. The arrangement according to claim 5, wherein the valve is designed such that the valve tappet for opening the valve gap has to be moved against the closing forces in direction towards the branch line.

8. The arrangement according to claim 1, wherein a static housing part of the adjusting unit, which at least partially is penetrated by the valve tappet, comprises radial or half axial passing through openings, through which the medium, depending on the passing through direction of the valve, can flow from the feed line the valve gap or can flow from the valve gap to the discharge line.

9. The arrangement according to claim 8, wherein the static housing part of the adjusting unit via sealing surfaces and/or via a sealing is in sealing contact with a static housing part of the valve housing which housing part is forming the feed line or the discharge line, such that between the passing through openings and the feed line or discharge line formed by this housing part a fluid-tight flow channel is formed.

10. The arrangement according to claim 9, wherein a face side of the static housing part of the adjusting unit via sealing surfaces and/or via a sealing is in sealing contact with the static housing part of the valve housing.

11. The arrangement according to claim 9, wherein the static housing part of the adjusting unit via sealing surfaces and/or via a sealing is in sealing contact with a static housing part of the branch line, such, that between the passing through openings and the branch line a fluid-tight flow channel is formed.

12. The arrangement according to claim 11, wherein a front face of the static housing part of the adjusting unit via sealing surfaces and/or via a sealing is in sealing contact with a static housing part of the branch line.

13. The arrangement according to claim 1, wherein the drive element is arranged in the axial extension of the valve tappet in the direction pointing away from the branch line.

14. The arrangement according to claim 13, wherein the drive element can directly act upon the end of the valve tappet which is facing away from the branch line, for moving the valve tappet in direction towards the branch line.

15. The arrangement according to claim 1, wherein the support structure is supported in the adjusting unit in such a way that the support structure latches in a dis-placement position in which the valve gap is open so that upon a cancellation of the manual pushing actuation the support structure stays in this displacement position.

16. The arrangement according to claim 15, wherein the support structure is supported in the adjusting unit in such a way and the drive element is arranged therein in such a way that the latching of the support structure can be cancelled by controlling or activating, respectively, the drive element.

17. The arrangement according to claim 15, wherein the support structure is supported in the adjusting unit in such a way that from outside the support structure is visually recognizable in the base position or in the latched displacement position.

18. The arrangement according to claim 1, wherein the actuator is exchangeable during the intended operation of the valve.

19. The arrangement according to claim 1, wherein for the generation of at least a part of the closing forces a spring is present, which are operatively connected with the valve closing body or the valve tappet in such a way that the valve gap, when the valve tappet is not actuated, is closed at least in part because of the spring forces of the spring, and when the valve tappet is actuated in order to open the valve gap, the spring forces of the spring have to be overcome.

20. The arrangement according to claim 1, wherein the feed line and the discharge line are formed by a common housing part or by separate housing parts.

21. The arrangement according to claim 1, wherein the adjusting unit opposite to the feed line or opposite to the discharge line penetrates into the housing.

22. The arrangement according to claim 21, wherein the valve closing body is arranged at that end of the valve tappet which is facing the opposite feed line or discharge line.

23. The arrangement according to claim 21, wherein the valve is designed such that for opening the valve gap, the valve tappet has to be moved towards the opposite feed line or discharge line.

24. The arrangement according to claim 1, wherein the valve closing body and the valve seat body are designed such that when the valve gap is closed an at least partial radial sealing between the valve closing body and the valve seat body results via a sealing element of the valve closing body which is at least partial radial sealing.

25. The arrangement according to claim 24, wherein the outermost radial circumferential margin of the valve closing body is formed by a separate sealing element which, when the valve gap is closed, effects an at least partial radial sealing as against the valve seat body and at the same time in a form-locking manner prevents that the valve tappet with the valve closing body in the closing movement direction of the valve tappet can be removed out of the adjusting unit.

26. The arrangement according to claim 1, wherein the valve as-supplied possesses removable arresting means, by means of which the valve tappet is arrested in an axial position in which the valve gap is opened.

27. The arrangement according to claim 26, wherein the arresting means are removable without the use of tools.

28. The arrangement according to claim 26, wherein the valve as-supplied possesses removable arresting means by means of which the valve tappet in a form-locking manner is arrested in an axial position in which the valve gap is opened.

29. The arrangement according to claim 26, wherein the arresting means comprise an arresting pin, which from the outside radially penetrates into the adjusting unit and thereby radially penetrates through the valve tappet or radially penetrates into the valve tappet.

30. The arrangement according to claim 1, wherein the valve tappet at least in the area of an end of the valve tappet which is facing away from the valve closing body is formed of a poorly conductive or non-conductive material.

31. A distribution arrangement comprising at least two arrangements according to claim 1, wherein the housing of the valves is formed by a common distribution manifold.

* * * * *